(12) United States Patent
Bassett et al.

(10) Patent No.: US 8,186,486 B2
(45) Date of Patent: May 29, 2012

(54) INERTIA BRAKE

(75) Inventors: Michael L. Bassett, Auburn, IN (US);
Troy S. Reinoehl, Golden, CO (US);
Barry T. Adams, Leo, IN (US); Mark C. Barnholt, Fort Wayne, IN (US);
Robb E. Grostefon, Fort Wayne, IN (US); Dean A. Geiger, Churubusco, IN (US); Steven J. Rynearson, Angola, IN (US); Steven E. McCutcheon, Fort Wayne, IN (US); Kevin F. Schlosser, Auburn, IN (US)

(73) Assignee: Eaton Corporation, Cleveland, OH (US)

( * ) Notice: Subject to any disclaimer, the term of this patent is extended or adjusted under 35 U.S.C. 154(b) by 758 days.

(21) Appl. No.: 12/325,656

(22) Filed: Dec. 1, 2008

(65) Prior Publication Data

US 2009/0120741 A1    May 14, 2009

Related U.S. Application Data

(63) Continuation-in-part of application No. 11/096,803, filed on Apr. 1, 2005, now abandoned.

(51) Int. Cl.
*F16D 67/02* (2006.01)
(52) U.S. Cl. ................ 188/73.2; 188/171; 192/13 R; 192/109 R

(58) Field of Classification Search ............ 188/71.2, 188/73.2, 72.3, 171; 192/70.28, 13 R, 218, 192/109 R
See application file for complete search history.

(56) References Cited

U.S. PATENT DOCUMENTS

| | | | |
|---|---|---|---|
| 3,527,329 A | 9/1970 | Jordan | |
| 3,942,617 A | 3/1976 | Poon et al. | |
| 4,043,437 A | 8/1977 | Taylor | |
| 4,635,776 A | 1/1987 | Billet et al. | |
| 4,817,775 A * | 4/1989 | Baccalaro et al. | 192/89.24 |
| 6,237,730 B1 * | 5/2001 | Dropmann et al. | 188/171 |
| 7,000,748 B2 | 2/2006 | Hornbrook et al. | |
| 7,073,641 B2 * | 7/2006 | Carriot | 188/171 |
| 2003/0062234 A1 | 4/2003 | Aker | |

* cited by examiner

*Primary Examiner* — Bradley King
(74) *Attorney, Agent, or Firm* — Honigman Miller Schwartz and Cohn LLP

(57) ABSTRACT

An inertia brake assembly is disclosed. In an embodiment, the inertia brake includes a rotor hub subassembly and an inertia brake subassembly. The inertia brake subassembly includes a first reaction plate arranged opposite a first side of the rotor hub assembly, a second reaction plate arranged opposite a second side of the rotor hub assembly, and one or more connector subassemblies connecting the first reaction plate to the second reaction plate. The one or more connector subassemblies include at least one or more resilient straps, and a spacer disposed between the one or more resilient straps and one of the first and second reaction plates. The spacer is arranged about a diameter of the rotor hub subassembly. In an embodiment, the inertia brake assembly includes a sleeve. An inertia brake subassembly is also disclosed.

11 Claims, 15 Drawing Sheets

INERTIA BRAKE

RELATED APPLICATION

This application is a continuation-in-part of U.S. patent application Ser. No. 11/096,803 filed on Apr. 1, 2005.

FIELD OF THE INVENTION

The present invention relates to the field of inertia brakes and to an inertia brake assembly suitable for use with friction clutches that may be used in, for example, medium-duty vehicles, heavy duty vehicles, of the like.

DESCRIPTION OF THE RELATED ART

Inertia brakes are known in the art and commonly used, for example, to rapidly slow the speed of a transmission input shaft to facilitate the shifting of gears in a transmission. Without an inertia brake, the time required to shift a transmission would be significantly increased, thereby complicating operation of the transmission in several driving modes.

Although conventional inertia brakes are useful, such inertia brakes are nevertheless susceptible to improvements that may enhance or improve their service life and/or performance. Therefore, a need exists in the art for the development of an improved inertia brake.

BRIEF DESCRIPTION OF THE DRAWINGS

The disclosure will now be described, by way of example, with reference to the accompanying drawings, in which.

DETAILED DESCRIPTION OF THE INVENTION

The Figures illustrate an exemplary embodiment of an inertia brake in accordance with an embodiment of the invention. Based on the foregoing, it is to be generally understood that the nomenclature used herein is simply for convenience and the terms used to describe the invention should be given the broadest meaning understood by one of ordinary skill in the art.

Figure 1:
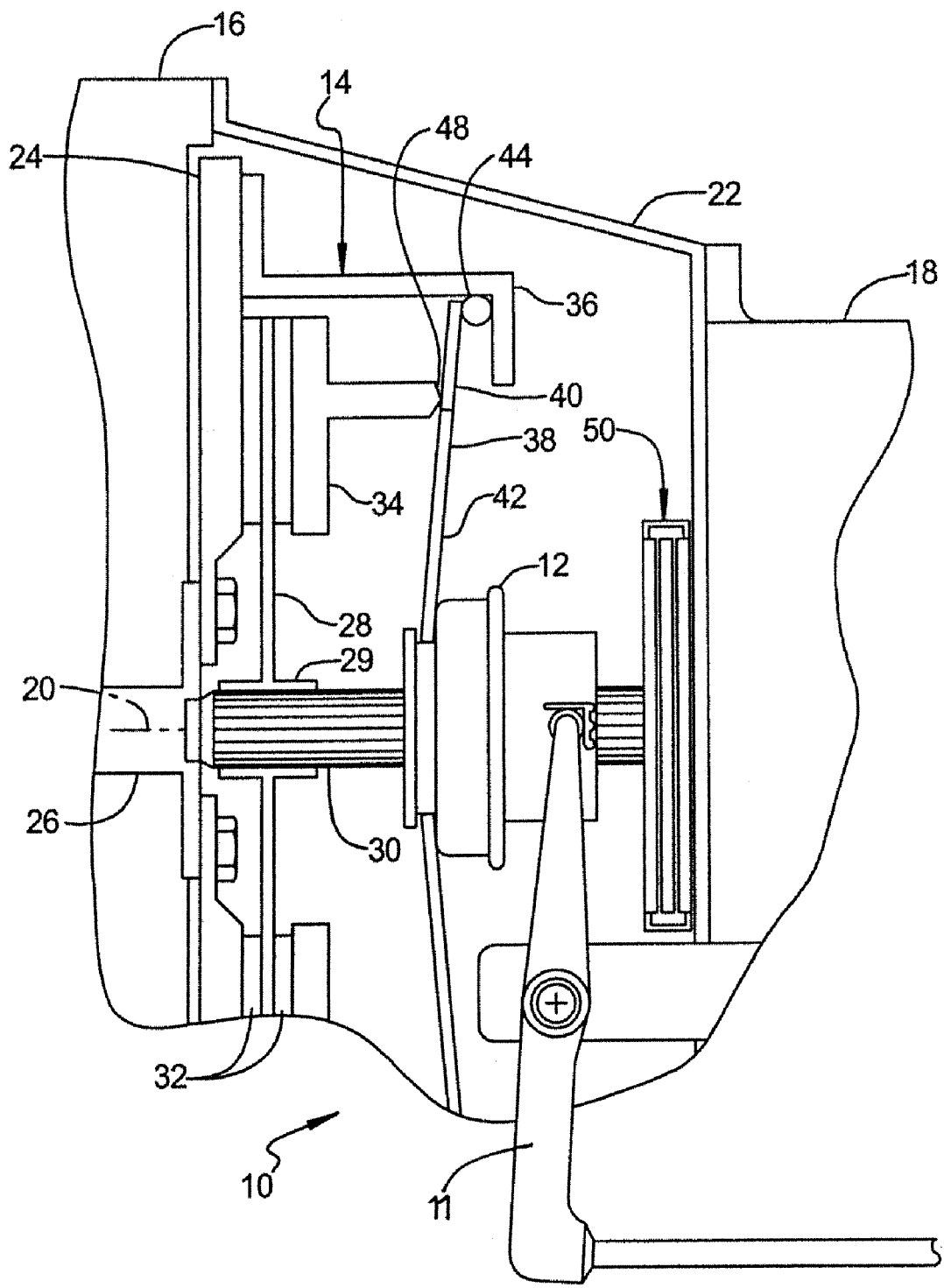
FIG. 1 is a schematic illustration of a vehicle powertrain system that includes an inertia brake in accordance with an exemplary embodiment of the invention.

A schematic illustration of an exemplary vehicle powertrain system is shown in FIG. 1. In the illustrated vehicle powertrain system, a clutch assembly is provided that includes a clutch release mechanism 10 selectively actuated by a vehicle operator using a foot actuated clutch pedal (not shown). Movement of the clutch pedal is transferred through a linkage 11 to a clutch release member 12. Alternatively, actuation could be provided by an automated mechanism, such as an electric servo or fluid-powered actuator (neither shown).

In the exemplary clutch assembly, a single-disc (shown) or multi-disc friction clutch 14 drivingly connects an engine 16 with a transmission assembly 18 and rotates about an axis 20. It will be appreciated that although a diaphragm spring clutch is illustrated in FIG. 1, the invention is not limited to a diaphragm spring clutch design; for example, it will be appreciated that in an alternative embodiment, the invention may include, for example, a coil spring clutch design. A clutch housing 22, sometimes referred to as a bell housing, connects an engine block of engine 16 with a housing of transmission assembly 18. A flywheel 24 is rotatably fixed to a crankshaft 26 of engine 16. A driven disc 28, centered with respect to axis 20, has a splined hub portion 29 that slideably engages a splined input shaft 30 of transmission 18. Driven disc 28 is at least partially sandwiched between flywheel 24 and a pressure plate 34 and includes friction elements 32 that frictionally contact flywheel 24 and pressure plate 34 when clutch 14 is engaged.

In the illustrated clutch assembly, a cover 36 is disposed over pressure plate 34 and is fixed to flywheel 24. A plurality of straps (not shown) circumferentially extend between pressure plate 34 and cover 36. The straps rotatably fix pressure plate 34 to cover 36 while allowing axial displacement of pressure plate 34 relative to cover 36. The straps are adapted to serve as springs, which can be used to bias pressure plate 34 away from flywheel 24.

A diaphragm spring 38 is axially disposed between cover 36 and pressure plate 34. An annular portion 40 of diaphragm spring 38 biases pressure plate 34 toward flywheel 24, clamping driven disc 28 between flywheel 24 and pressure plate 34 to rotatably connect or lock input shaft 30 with flywheel 24 when clutch 10 is in an engaged position. Diaphragm spring 38 has a plurality of radially inwardly extending fingers 42, the inner tips of which are engaged by the axially displaceable release member 12. A pivot ring 44, or other pivot feature such as a bead formed in the cover, is axially disposed between an outer diameter of annular portion 40 and cover 36 to facilitate pivoting or flexing of annular portion 40 relative to cover 36.

Clutch 14 is selectively released or disengaged by axially displacing release member 12 along axis 20 in a direction away from flywheel 24 against the force of diaphragm spring 38. Such displacement is achieved by a vehicle operator depressing the pedal, for example, with the motion of the pedal being transferred via linkage 11 to displace release member 12. As the radially inner tips of fingers 42 are axially displaced away from flywheel 24, fingers 42 bow, causing annular portion 40 to deflect, thereby relieving the clamping load against pressure plate 34, and permitting rotation of input shaft 30 relative to flywheel 24. Annular portion 40 engages a fulcrum 48 of pressure plate 34 proximate to an inner diameter of annular portion 40.

In the illustrated embodiment, clutch housing 22 provides a grounded surface against which an inertia brake 50 may be compressed by the axial movement of release member 12. Release member 12 is moved axially to press against inertia brake 50 when clutch 14 is disengaged and it is desired to slow rotation of transmission input shaft 30 to facilitate a gear ratio change in transmission 18. Alternatively, a portion of transmission 18, such as the transmission housing, may provide the grounded surface against which inertia brake 50 is compressed when clutch 14 is disengaged.

Figure 2:
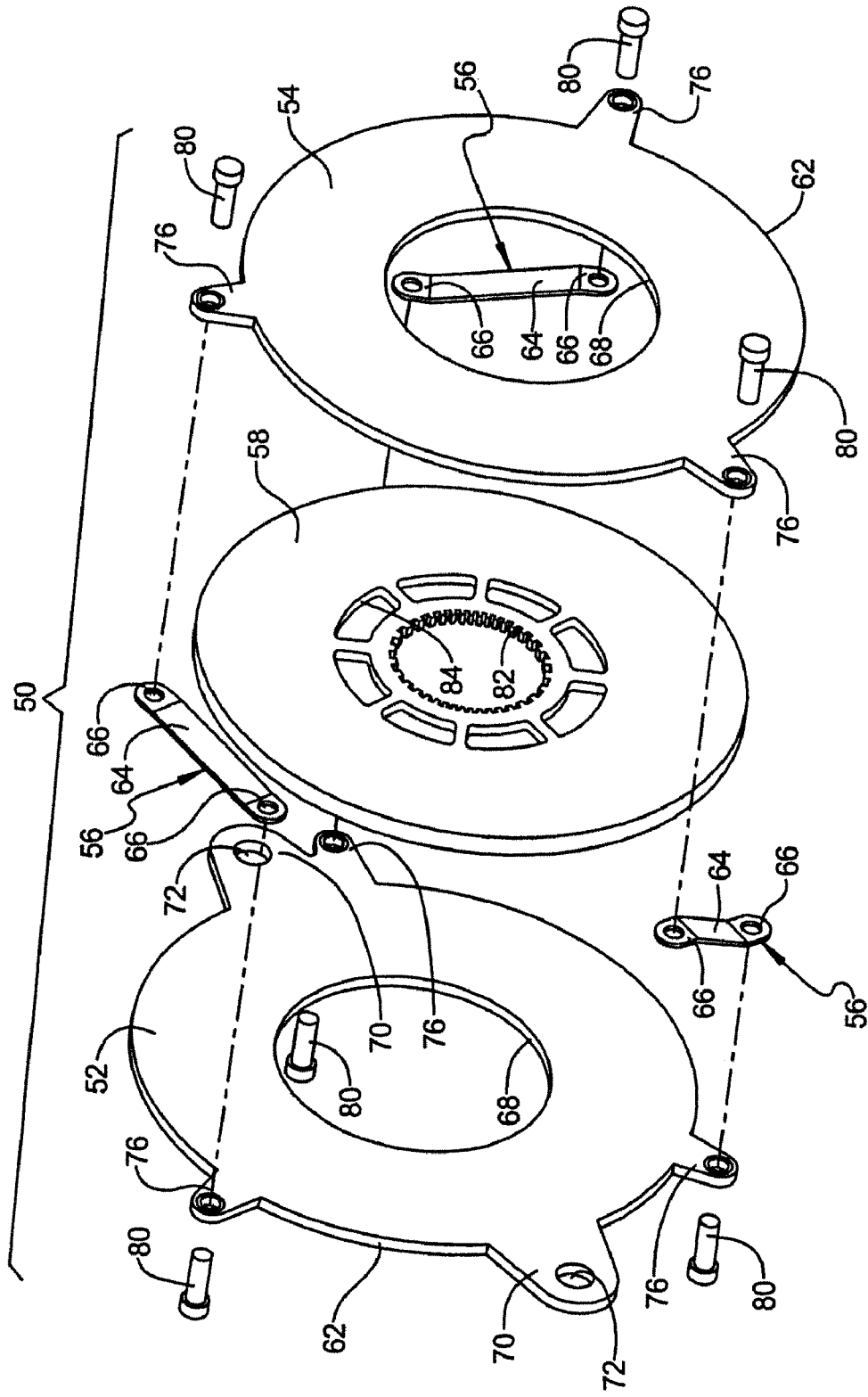
FIG. 2 is an exploded perspective view of an inertia brake in accordance with an exemplary embodiment of the invention.
Figure 3:
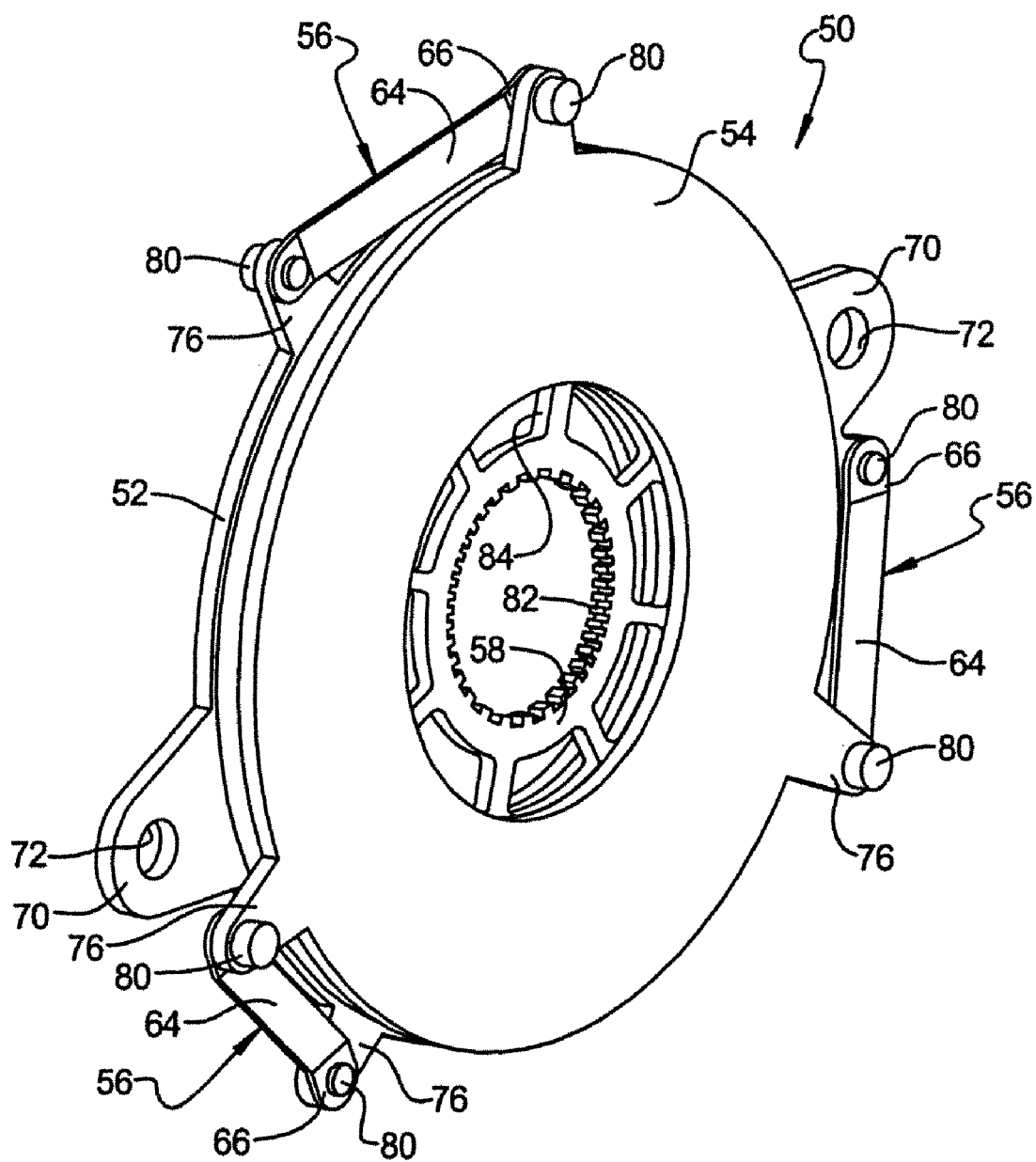
FIG. 3 is a perspective view of the inertia brake of FIG. 2 shown assembled in accordance with an exemplary embodiment of the invention.

Referring to FIGS. 2 and 3, an inertia brake assembly 50 according to an embodiment of the present invention is shown. Inertia brake assembly 50 includes a first reaction member 52, a second reaction member 54 attached to and moveably separated from first reaction member 52 by at least one resilient strap 56. Inertia brake assembly 50 also includes a rotor 58 rotatably driven by and slideably disposed on input shaft 30. When inertia brake 50 is assembled, rotor 58 is retained between first and second reaction members 52, 54 by resilient strap 56. Resilient strap 56 separates first and second reaction members 52, 54 to allow rotor 58 to rotate freely and is resiliently compressible to allow first and second reaction members 52, 54 to selectively and frictionally engage rotor 58.

In an embodiment, second reaction member 54 is attached to and moveably separated from first reaction member 52 by a plurality of resilient straps 56. Straps 56 may be positioned about a circumferential edge 62 of first and second reaction members 52, 54 to retain rotor 58 therebetween. Straps 56 may non-rotatably fix first reaction member 52 to second reaction member 54 while allowing axial displacement of second reaction member 54 relative to first reaction member 52. In the embodiment shown in FIGS. 2 and 3, straps 56 include a main strap portion 64 that retains rotor 58 between first and second reaction members 52, 54 and a pair of reaction member attachment tabs 66 that are axially separated (see, e.g., FIGS. 5 and 6) to accommodate a spin gap (i.e., gap that permits rotation of rotor 58) between first and second reaction members 52, 54 and the thickness of rotor 58. Straps 56 may be made from a resilient material, such as spring steel, which allows reaction member attachment tabs 66 to pivot relative main strap portion 64 during compression of brake assembly 50.

Figure 4:
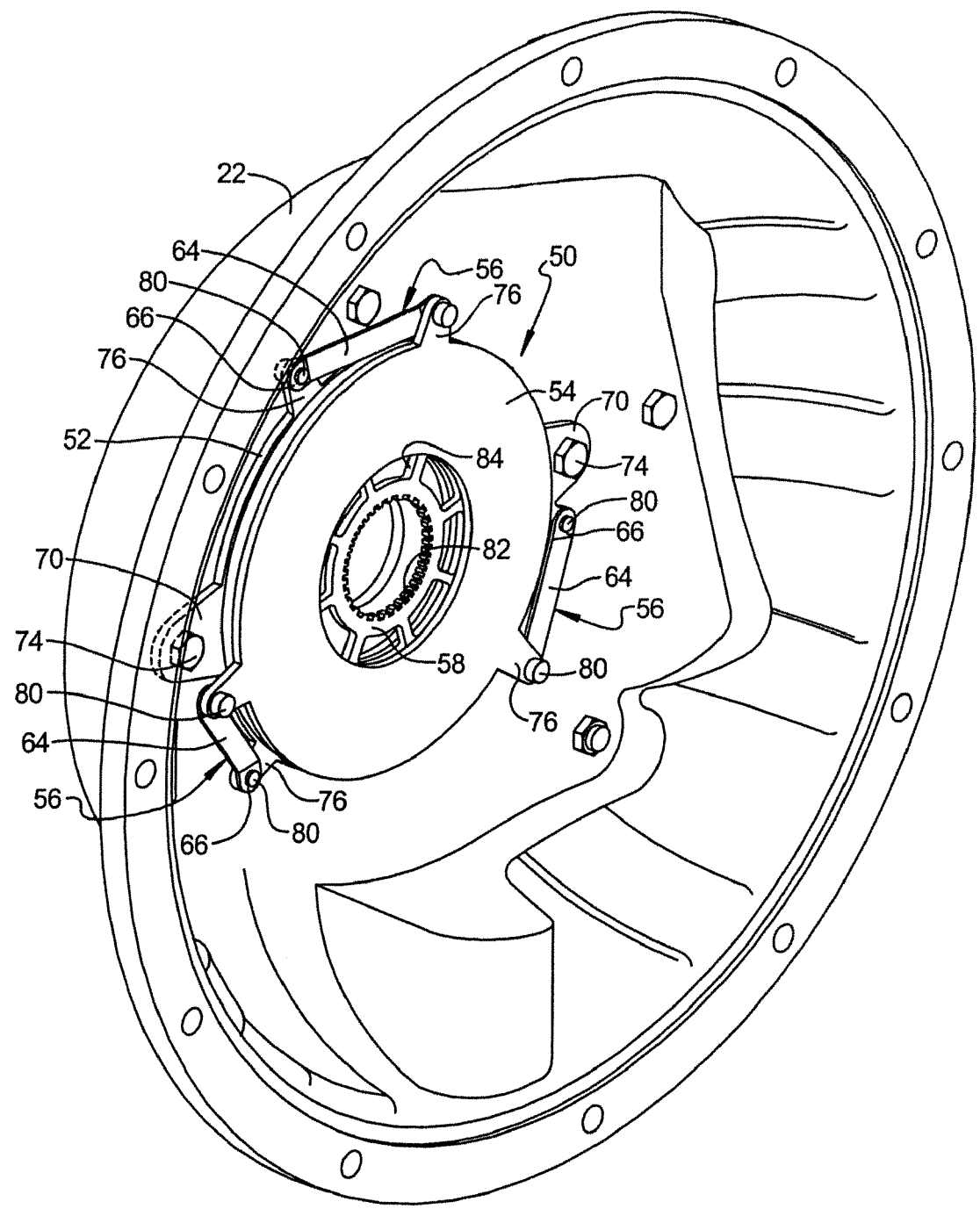
FIG. 4 is a perspective view of the inertia brake of FIGS. 2 and 3 installed in an exemplary clutch housing in accordance with an exemplary embodiment of the invention.

In an embodiment, first and second reaction members 52, 54 are generally annular plates that include a hole 68 for passage of input shaft 30. To secure brake assembly 50 to clutch housing 22, first reaction member 52 may include at least one mounting bracket 70. Mounting bracket 70 includes a hole or aperture 72 that aligns with a corresponding hole or aperture in clutch housing 22 (or a transmission housing as noted above) to cooperatively receive a fastener 74 (see, e.g., FIG. 4), such as a bolt and the like, for securing brake assembly 50 to clutch housing 22 (or transmission housing). First and second reaction members 52, 54 may also include strap attachment brackets 76 having a hole or aperture that aligns with a corresponding hole or aperture in reaction member attachment tabs 66 to cooperatively receive a fastener 80, such as a rivet and the like, for securing strap 56 to first and second reaction members 52, 54. Strap attachment brackets 76 may be positioned on first and second reaction members 52, 54 so that each strap 56 does not overlap mounting bracket 70 or otherwise impede passage of fastener 74 through the mounting bracket hole or aperture 72 when brake assembly 50 is secured to clutch housing 22.

To facilitate a relatively rapid reduction in speed of rotor 58, a rotor-facing side of first and second reaction members 52, 54 may include a friction material (not shown). The friction material may be adapted to cover substantially all of or only a portion of each reaction member 52, 54. Any suitable friction material may be provided on reaction members 52 and 54, including those materials used in conventional clutch brakes. Since reaction members 52, 54 may be made from a low carbon steel, such as AISI 1008 and AISI 1010 steel, the friction material may be readily bonded to reaction members 52, 54 using known bonding processes. Furthermore, low carbon steel does not require heat-treatment and the manufacturing expense associated therewith. Furthermore, in an embodiment, the reaction members 52, 54 may include, for example, iron.

In an embodiment, rotor 58 is a generally smooth metal disc, which includes an internal spline 82 that secures rotor 58 for rotation with input shaft 30. When so configured, rotor 58 is axially slideable in relation to both input shaft 30 and first and second reaction members 52, 54. Alternatively, rotor 58 may be configured as a torque-limiting rotor.

At least one hole 84 may be provided in rotor 58 to reduce its weight and/or facilitate cooling when frictionally engaged by first and second reaction members 52, 54. If desired, tabs or other features (not shown) may be formed in first and second reaction members 52, 54 to constrain rotor 58 on input shaft 30 and/or more precisely position rotor 58 within brake assembly 50 for installation in clutch housing 22. In an embodiment, the design of the at least one hole 84 may be modified to include a plurality of radially-directed key-hole slots (see, e.g., 214, 215 in FIG. 8); functionally, key-hole slots increase reliability of the inertia brake by reducing/eliminating hoop stresses on the outer diameter of the rotor, which are created when temperature increases through the use of the inertia brake.

Figure 5:
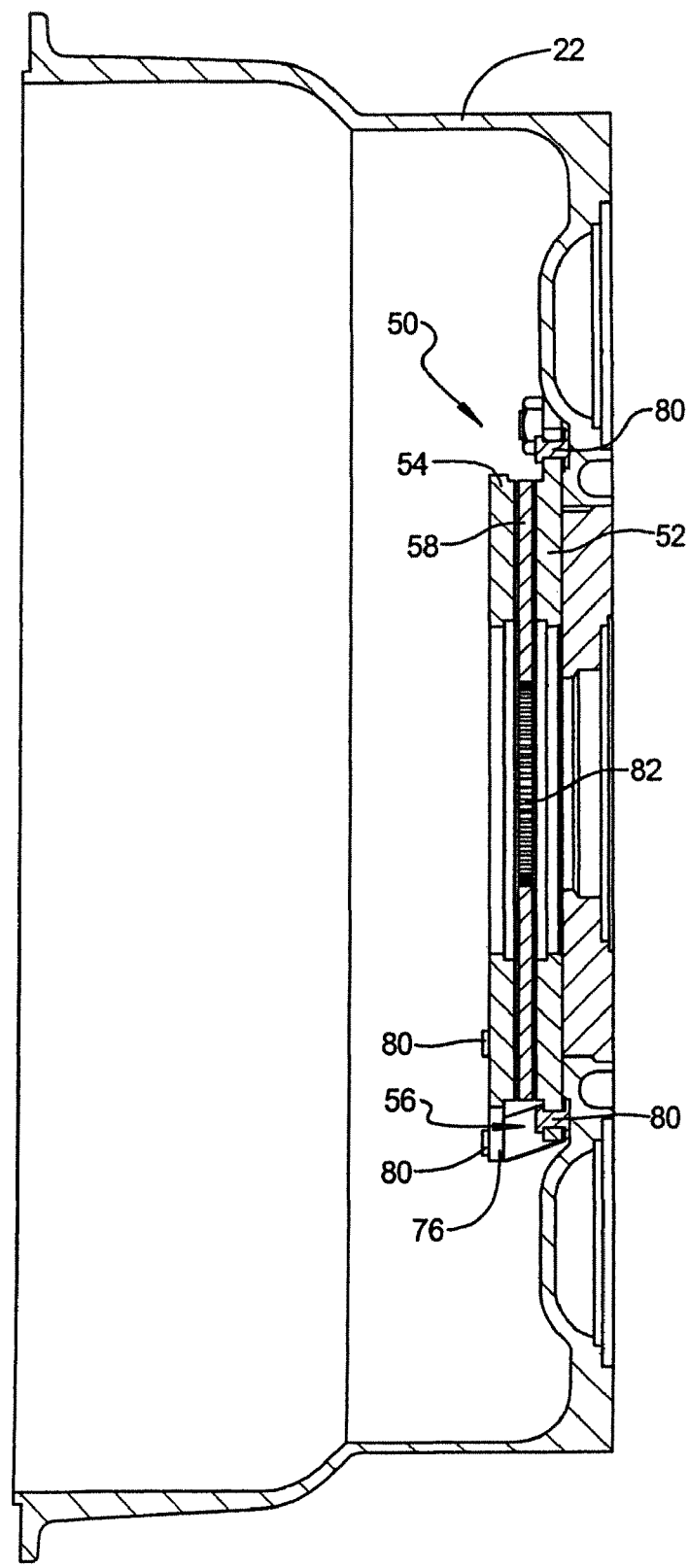
FIG. 5 is a cross-sectional view of the inertia brake and clutch housing of FIG. 4, showing the inertia brake in an expanded state in accordance with an exemplary embodiment of the invention.
Figure 6:
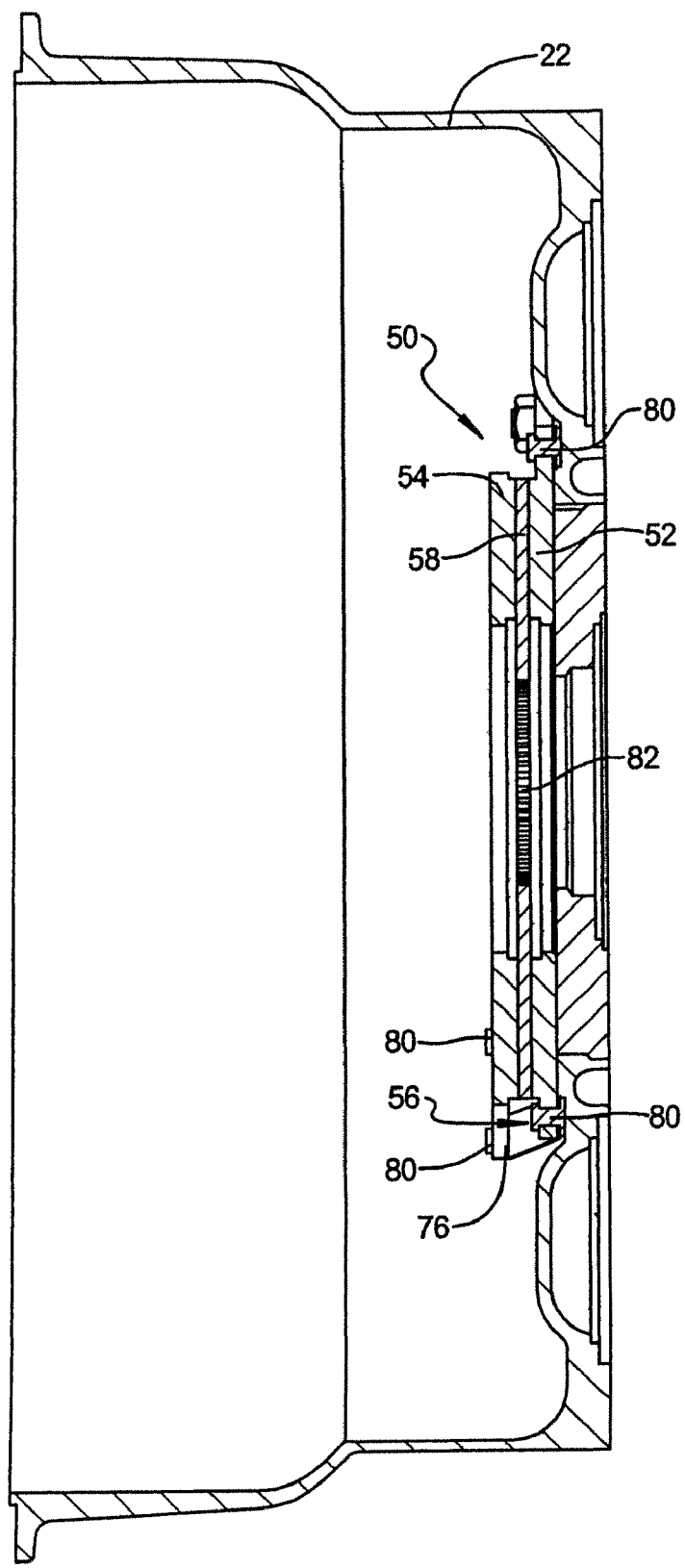
FIG. 6 is a cross-sectional view of the inertia brake and clutch housing of FIG. 4, showing the inertia brake in a compressed state in accordance with an exemplary embodiment of the invention.

Operation of brake assembly 50 will now be described with reference to FIGS. 1, 5 and 6. When clutch 14 is engaged, release member 12 is disengaged from brake assembly 50 and first and second reaction members 52, 54 are spaced apart from rotor 58 due to the spring force applied by straps 56 (see, e.g., FIGS. 1 and 5). In this manner, rotor 58 is free to rotate with input shaft 30 as torque is transmitted from engine 16 through clutch 14 and into transmission 18.

When it is desired to rapidly slow rotation of input shaft 30 to facilitate a gear ratio change in transmission 18, clutch 14 is disengaged and release member 12 is moved axially into contact with second reaction member 54. Release member 12 compresses brake assembly 50 against clutch housing 22, causing each of first and second reaction plates 52, 54 to frictionally contact rotor 58 (see, e.g., FIG. 6). The frictional contact between first and second reactions members 52, 54 and rotor 58 slows or stops rotation of rotor 58 and consequently input shaft 30. When clutch 14 is re-engaged, release member 12 disengages from brake assembly 50, allowing the spring force of straps 56 to separate second reaction plate 54 from first reaction plate 52 and rotor 58 to rotate freely.

Although brake assembly 50 of the present invention is particularly suited for use as an inertia brake for slowing rotation of a transmission input shaft disposed between a clutch and a transmission of a motor vehicle, brake assembly 50 may be used in other applications requiring the rotational slowing of a shaft.

Figure 7A:
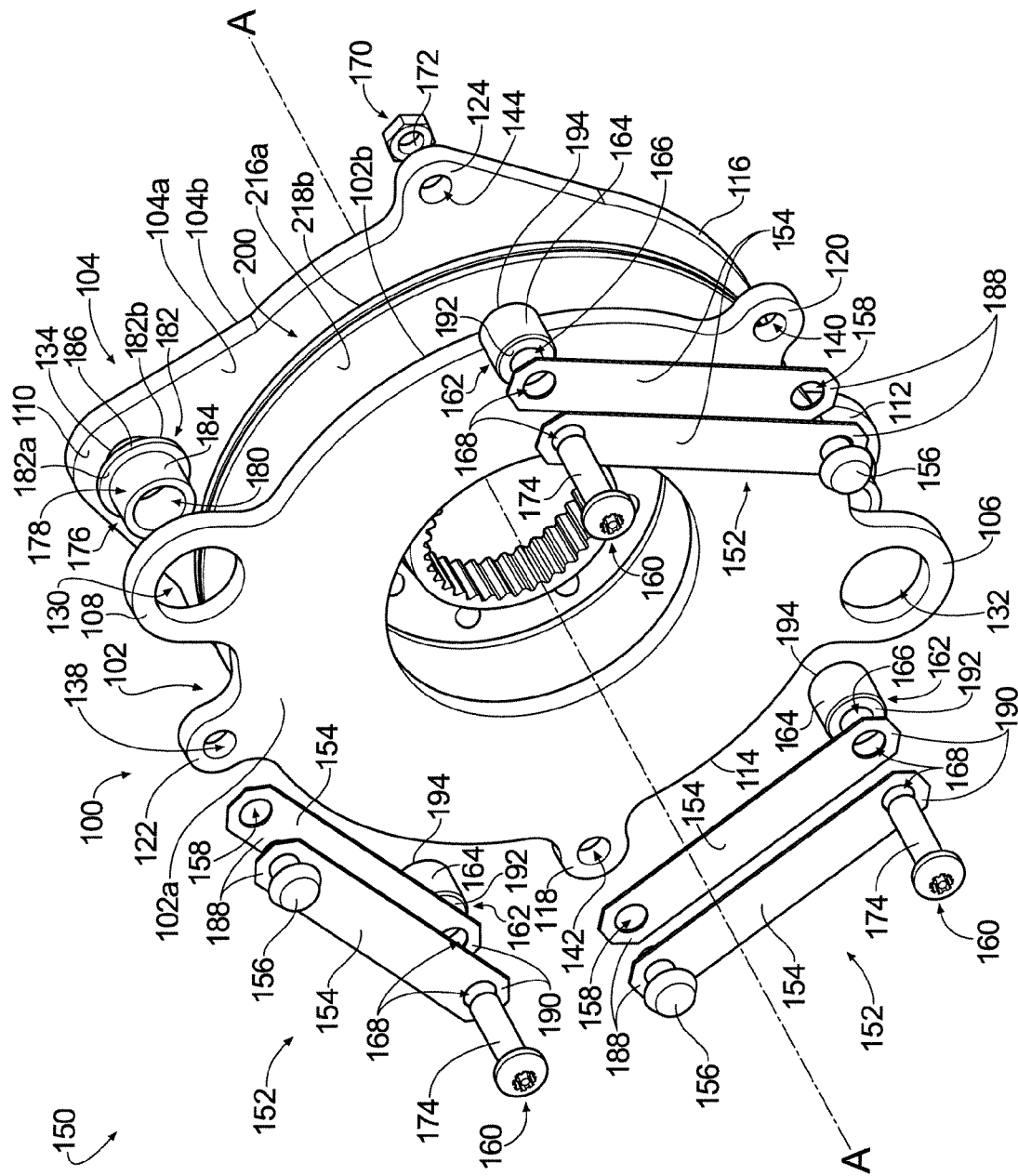
FIG. 7A is an exploded perspective view of an inertia brake according to an embodiment of the present invention.
Figure 7B:
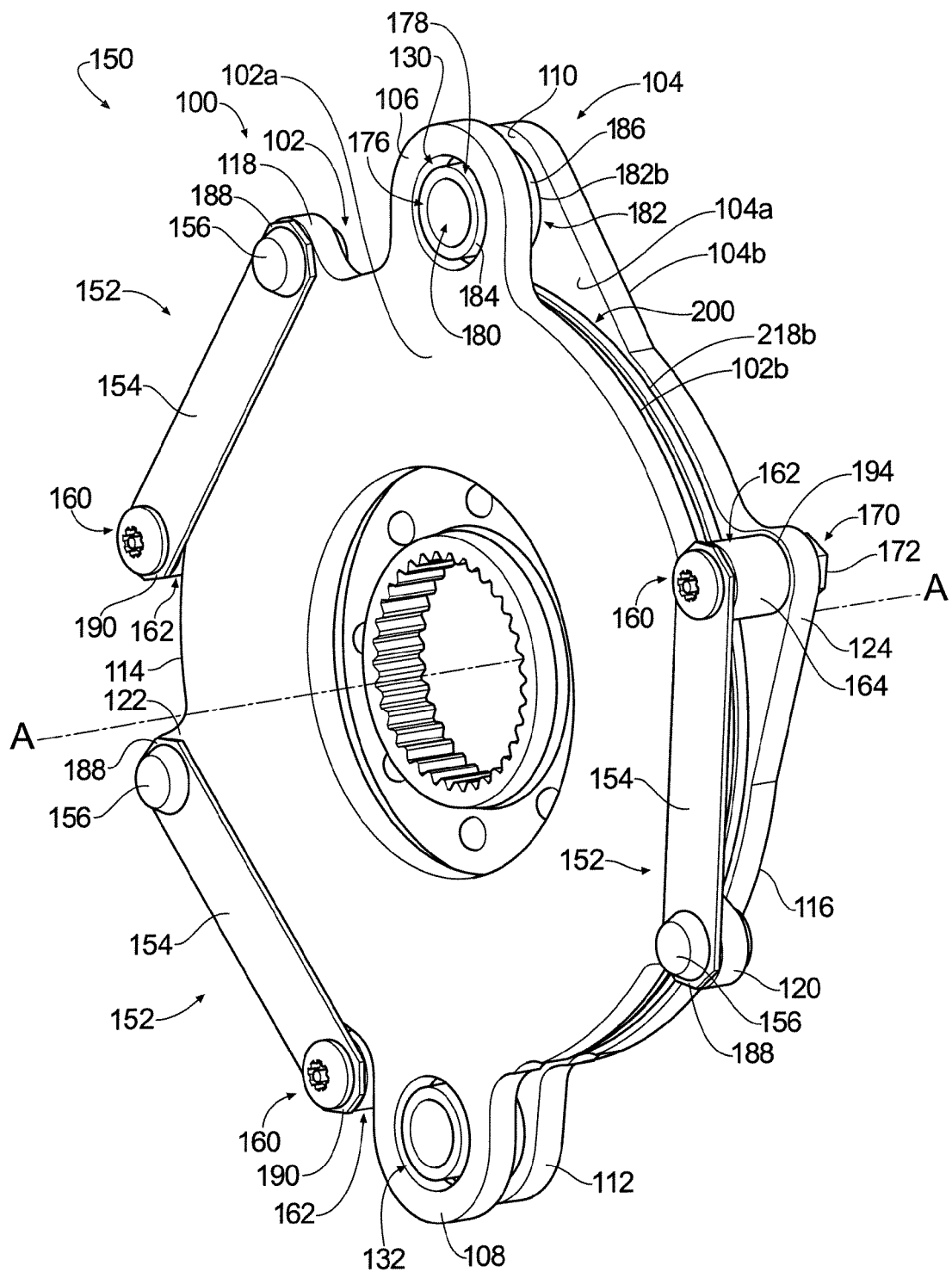
FIG. 7B is a perspective view of the inertia brake of FIG. 7A shown assembled in accordance with an exemplary embodiment of the invention.

Referring to FIGS. 7A-7B, an inertia brake assembly is shown generally at 150 in accordance with an embodiment of the invention. In an embodiment, the inertia brake assembly 150 may be connected to the clutch housing 22, a portion of a transmission 18, or the like, which are shown, for example, in FIG. 1. In an embodiment, if connected to the transmission 18, the inertia brake assembly 150 may be connected to the drive shaft. As such, it will be appreciated that the inertia brake assembly 150 may be connected to any desirable structure and is not limited to what is described in the embodiments discussed above.

In operation, the inertia brake assembly 150 may be compressed by axial movement (relative axis, A-A) of a release member 12. In a substantially similar manner as described above, the release member 12 may be moved axially to press against the inertia brake assembly 150 when the clutch 14 is disengaged to slow rotation of a transmission input shaft 30 to facilitate a gear ratio change in the transmission 18.

Figure 8:
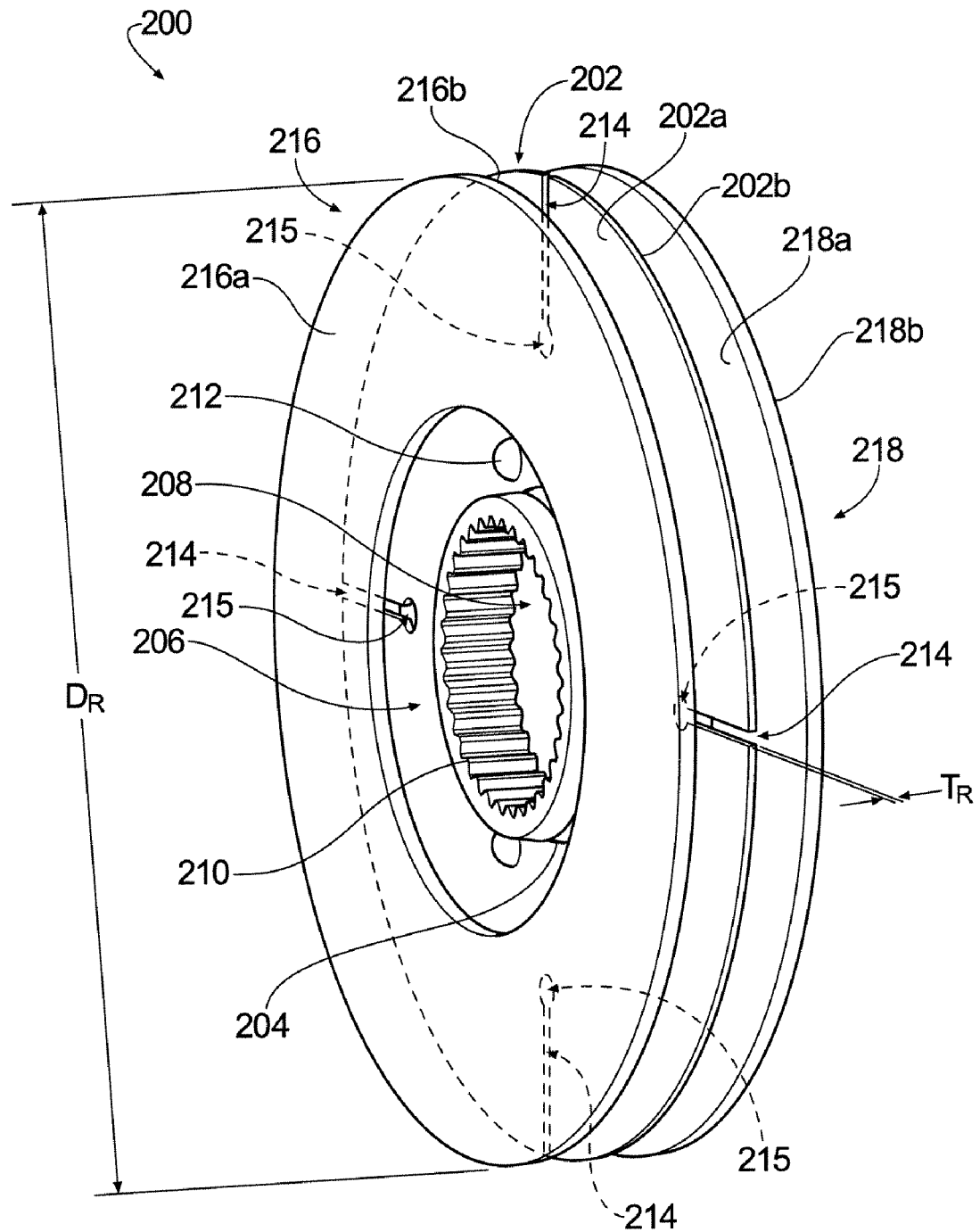
FIG. 8 is an exploded view of a rotor hub assembly of FIGS. 7A, 7B in accordance with an exemplary embodiment of the invention.
Figure 9:
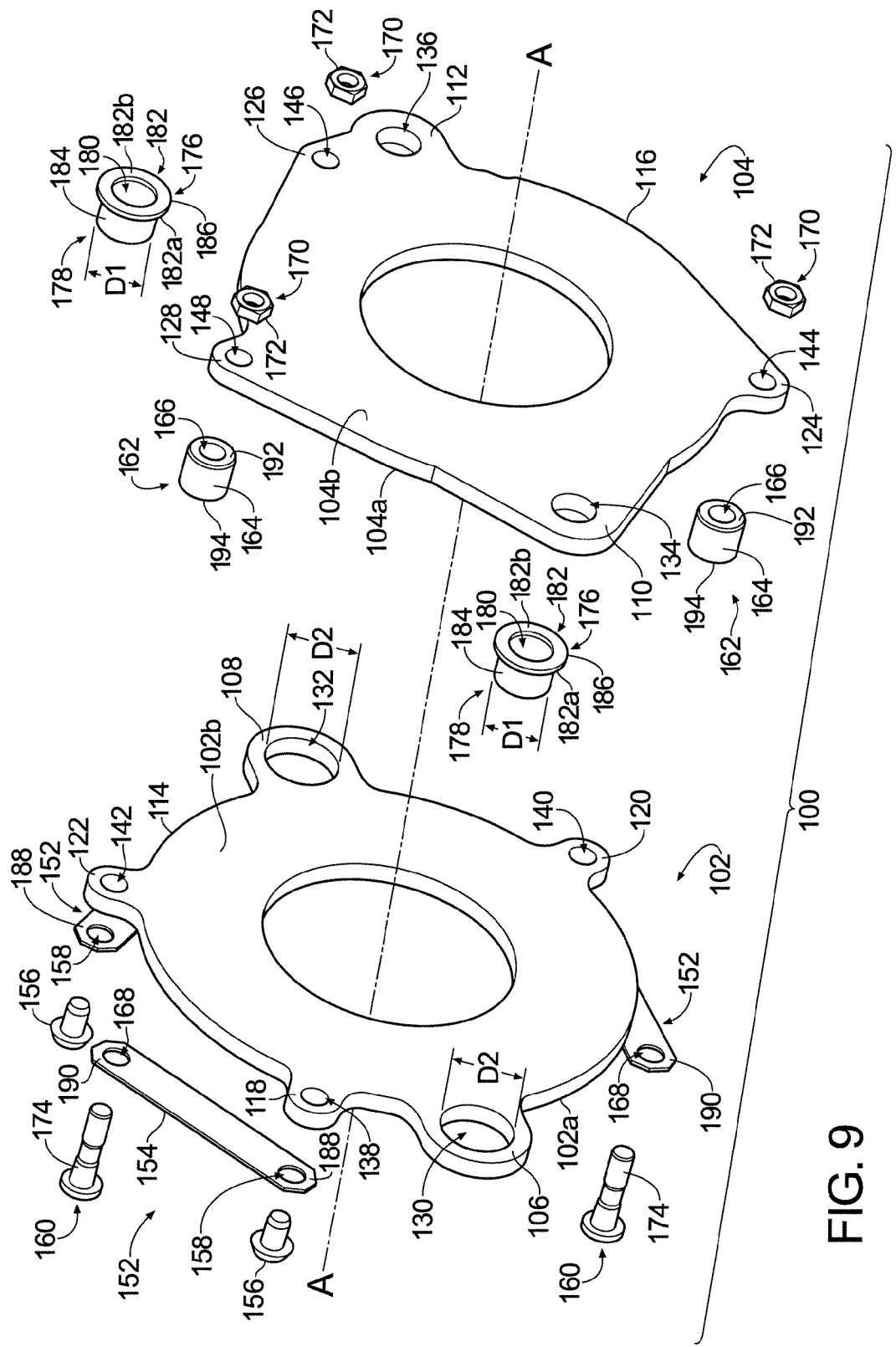
FIG. 9 is an exploded view of an inertia brake subassembly of FIGS. 7A, 7B in accordance with an exemplary embodiment of the invention.

As seen in FIGS. 7A-7B and 9, the inertia brake assembly 150 generally includes a plurality of components that, when assembled together, define an inertia brake subassembly 100. Referring to FIGS. 7A-7B and 8, when assembled together, it will be appreciated that at least a portion of the inertia brake subassembly 100 entraps and loosely-retains a rotor hub subassembly, which is shown generally at 200 in accordance with an embodiment of the invention. In combination, it will be appreciated that the inertia brake subassembly 100 and the rotor hub subassembly 200 may be referred to collectively as the inertia brake assembly 150.

It will be appreciated that the retaining of the rotor hub subassembly 200 by the inertia brake subassembly 100 permits a quick and easy connection of the inertia brake assembly 150 to, for example, one or more of the clutch housing 22 and transmission 18 when the inertia brake assembly 150 is received by an original equipment manufacturer (OEM) such that no further assembly of the inertia brake assembly 150 is needed at an installation site. Further, it will be appreciated that the retaining of the rotor hub subassembly 200 by the inertia brake subassembly 100 permits the inertia brake assembly 150 to be compactly stowed in a shipping state that prevents the separation of the rotor hub subassembly 200 and the inertia brake subassembly 100.

As seen in FIG. 8, the rotor hub subassembly 200 is shown in accordance with an embodiment of the invention. The rotor hub subassembly 200 generally includes a substantially circular rotor 202 defining a front surface 202a and a second/rear surface 202b and substantially circular central opening 204.

In an embodiment, the rotor hub subassembly 200 further includes a substantially circular hub portion 206. The hub portion 206 may define a substantially circular input shaft opening 208 having a toothed or splined inner circumferential surface 210 that permits the input shaft 30 to be joined to the hub portion 206. In an embodiment, the hub portion 206 may be joined to the rotor 202 proximate the central opening 204 by one or more rivets 212.

Further, in an embodiment, the rotor 202 may define one or more radially projecting slots 214 terminating with substantially circularly-shaped key-holes 215. In an embodiment, the slots 214 and key-holes 215 may define, for example, passages that extend through a thickness, $T_R$, of the rotor 202. Functionally, the one or more slots 214, key-holes 215 extend through the thickness, $T_R$, and may provide several functions, such as, for example, reducing the weight of the rotor 202 and facilitating cooling of the rotor 202. Further, the slots 214 and key-hole 215 increase reliability of the inertia brake assembly 150 by reducing/eliminating hoop stresses on the outer diameter of the rotor 202, which are created when temperature increases through the use of the inertia brake assembly 150.

In an embodiment, the rotor hub subassembly 200 also includes a first/front plate 216 and a second/rear plate 218. In an embodiment, the first/front plate 216 may be disposed adjacent and attached to the first/front surface 202a of the rotor 202, and the second/rear plate 218 may be disposed adjacent and attached to the second/rear surface 202b of the rotor 202.

In an embodiment, the first/front plate 216 and the second/rear plate 218 each comprise a friction material, and, as such, may each be hereinafter referred to as a first/front friction plate 216 and a second/rear friction plate 218. In an embodiment, the friction material comprising each of the friction plates 216, 218 may be adapted to cover substantially all of each of the front and rear surfaces 202a, 202b of the rotor 202; alternatively, in an embodiment, it will be appreciated that the friction material comprising each of the friction plates 216, 218 may be adapted to cover a portion of each of the front and rear surfaces 202a, 202b of the rotor 202.

In an embodiment, the first/front friction plate 216 includes a front surface 216a and a rear surface 216b. In an embodiment, the second/rear friction plate 218 includes a front surface 218a and a rear surface 218b. In an embodiment, the rear surface 216b of the first/front friction plate 216 is disposed adjacent the first/front surface 202a of the rotor 202. In an embodiment, the front surface 218a of the second/rear friction plate 218 is disposed adjacent the second/rear surface 202b of the rotor 202.

In an embodiment, the material comprising the friction plates 216, 218 may include any desirable material, such as, for example, a paper-based material, an organic-based material, a sintered-/centered-metallic material, or the like. In an embodiment, the rotor 202 may include, for example, medium carbon steel, high carbon steel, or the like. In an embodiment, the friction material comprising the friction plates 216, 218 may be readily bonded to the front and rear surfaces 202a, 202b of the rotor 202 using any desirable bonding process.

Referring to FIG. 9, the inertia brake subassembly 100 is described in accordance with an embodiment of the invention. In an embodiment, the inertia brake subassembly 100 includes at least a first/front reaction plate member that is shown generally at 102 and a second/rear reaction plate member that is shown generally at 104.

In an embodiment, the first/front reaction plate 102 includes a front surface 102a and a rear surface 102b. In an embodiment, the second/rear reaction plate 104 includes a front surface 104a and a rear surface 104b.

In an embodiment, the rear surface 102b of the first/front reaction plate 102 may face/be arranged in an opposing relationship with respect to the front surface 216a of the first/front friction plate 216. In an embodiment, the front surface 104a of the second/rear reaction plate 104 may face/be arranged in an opposing relationship with respect to the rear surface 218b of the second/rear friction plate 218.

In an embodiment, the first/front reaction plate 102 includes one or more reaction plate hoops/brackets that are shown generally at 106, 108. In an embodiment, the second/ rear reaction plate 104 includes one or more brackets 110, 112. In an embodiment, the one or more brackets 106, 108 of the first/front reaction plate 102 include two brackets defining a first pair of brackets, and, similarly, the one or more brackets 110, 112 of the second/rear reaction plate 104 include two brackets defining a second pair of brackets.

In an embodiment, each bracket 106, 108 and 110, 112 defining the pairs of brackets extend radially, in a corresponding relationship, from a circumferential edge 114, 116 of each reaction plate 102, 104. In an embodiment, each bracket 106, 108 and 110, 112 of each reaction plate 102, 104 are arranged on the circumferential edge 114, 116 approximately 180° apart.

In an embodiment, the first/front reaction plate 102 includes one or more projections that are shown generally at 118, 120 and 122. In an embodiment, the second/rear reaction plate 104 includes one or more projections 124, 126 and 128.

In an embodiment, the one or more projections 118-122 of the first/front reaction plate 102 defines three projections that extend radially from the circumferential edge 114 of the first/front reaction plate 102. In an embodiment, the one or more projections 124-128 define three projections that extend radially from the circumferential edge 116 of the second/rear reaction plate 104.

In an embodiment, the one or more projections 118-122, 124-128 define at least three projections that extend radially, in a corresponding relationship, from a circumferential edge 114, 116 of each reaction plate 102, 104. In an embodiment, each projection 118, 122 and 126, 128 are arranged on the circumferential edge 114, 116 of each reaction plate 102, 104 approximately 60° apart. In an embodiment, each projection 118, 120 and 124, 126 are arranged on the circumferential edge 114, 116 of each reaction plate 102, 104 approximately 120° apart. In an embodiment, each projection 120, 122 and 124, 128 are arranged on the circumferential edge 114, 116 of each reaction plate 102, 104 approximately 120° apart.

In an embodiment, each of the brackets 106, 108 of the first reaction plate 102 define passages that are shown generally at 130, 132, respectively. In an embodiment, each of the brackets 110, 112 of the second reaction plate 104 define passages that are shown generally at 134, 136, respectively.

In an embodiment, each of the projections 118, 120, 122 of the first reaction plate 102 define passages that are shown generally at 138, 140 and 142, respectively. In an embodiment, each of the projections 124, 126, 128 of the second reaction plate 104 define passages that are shown generally at 144, 146, 148, respectively.

In an embodiment, the passages 130-136 of the brackets 106-112 permit the inertia brake subassembly 100 to be attached to structure, as described above. In an embodiment, the passages 138-148 of the projections 118-128 permit the first/front reaction plate 102 to be connected to the second/rear reaction plate 104 by a plurality of connector subassemblies 152 that are circumferentially disposed about inertia brake subassembly 100.

Referring to FIGS. 7A-7B, in an embodiment, each of the connector subassemblies 152 include one or more drive straps/resilient spring straps 154. In an embodiment, the one or more resilient spring straps 154 includes at least two resilient spring straps defining a pair of spring straps. Although each connector subassembly 152 is shown to include a pair of spring straps 154, it will be appreciated that the invention is not limited to the illustrated embodiment and that the invention may be practiced with any desirable number of spring straps 154, such as, for example, one spring strap 154, two spring straps 154, three spring straps 154 or the like.

In an embodiment, the one or more resilient spring straps 154 are used to movably separate or bias the first/front reaction plate 102 axially away from the second/rear reaction plate 104. As such, when the clutch 14 is engaged, the one or more resilient straps 154 bias the first/front reaction plate 102 axially away from the second/rear reaction plate 104 in order to permit the rotor 202 of the rotor hub subassembly 200 to rotate freely with the input shaft 30 as torque is transmitted from the engine 16 through the clutch 14 and into the transmission 18. Conversely, when the clutch 14 is disengaged, the release member 12 is moved as so to contact the first/front reaction plate 102 in order to overcome the axial outward bias of the one or more resilient straps 154 such that the reaction plates 102, 104 compress the rotor hub subassembly 200 in order to slow or stop rotation of the rotor 202, and, consequently, rotation of the input shaft 30 that is connected to the rotor 202 by way of the hub portion 206.

In an embodiment, each of the connector subassemblies 152 further comprise a first fastener 156, such as, for example, a rivet. In an embodiment, the rivet 156 extends through a first passage 158 defined by the resilient strap 154 and into a passage 138-142 defined by one of the projections 118-122 of the first/front reaction plate 102.

In an embodiment, each of the connector subassemblies 152 further comprise a second fastener 160, such as, for example, a bolt. Further, in an embodiment, each of the connector subassemblies 152 further comprise a spacer 162 that is defined, in an embodiment, to include a substantially cylindrical body 164 having a passage 166 extending through the substantially cylindrical body 164. In an embodiment, the spacer 162 may comprise any desirable material, such as, for example, low carbon steel, medium carbon steel or the like.

In an embodiment, the bolt 160 extends through a second passage 168 defined by the resilient strap 154, the passage 166 defined by the spacer 162, and a passage 144-148 defined by one of the projections 124-128 of the second/rear reaction plate 104. Once the bolt 160 extends through the passage 144-148 define by one of the projections 124-128, a nut 170 including a threaded inner surface 172 may be joined to a corresponding threaded surface 174 defined by an outer circumferential surface of the bolt 160.

In an embodiment, the inertia brake subassembly 100 may also include one or more sleeves, which is shown generally at 176. In an embodiment, a sleeve 176 is inserted through each passage 130, 132 defined by the brackets 106, 108 of the first/front reaction plate 102 prior to the joining of first and second reaction plates 102, 104 as described above with the connector subassemblies 152.

In an embodiment, each sleeve 176 includes a substantially cylindrical body 178 having a passage 180 extending through the substantially cylindrical body 178. In an embodiment, as seen in FIG. 9, each substantially cylindrical body 178 is defined to include a diameter, D1, than is substantially equal to, but less than a diameter, D2, of the passage 130, 132 defined by the brackets 106, 108 of the first/front reaction plate 102.

Figure 10:
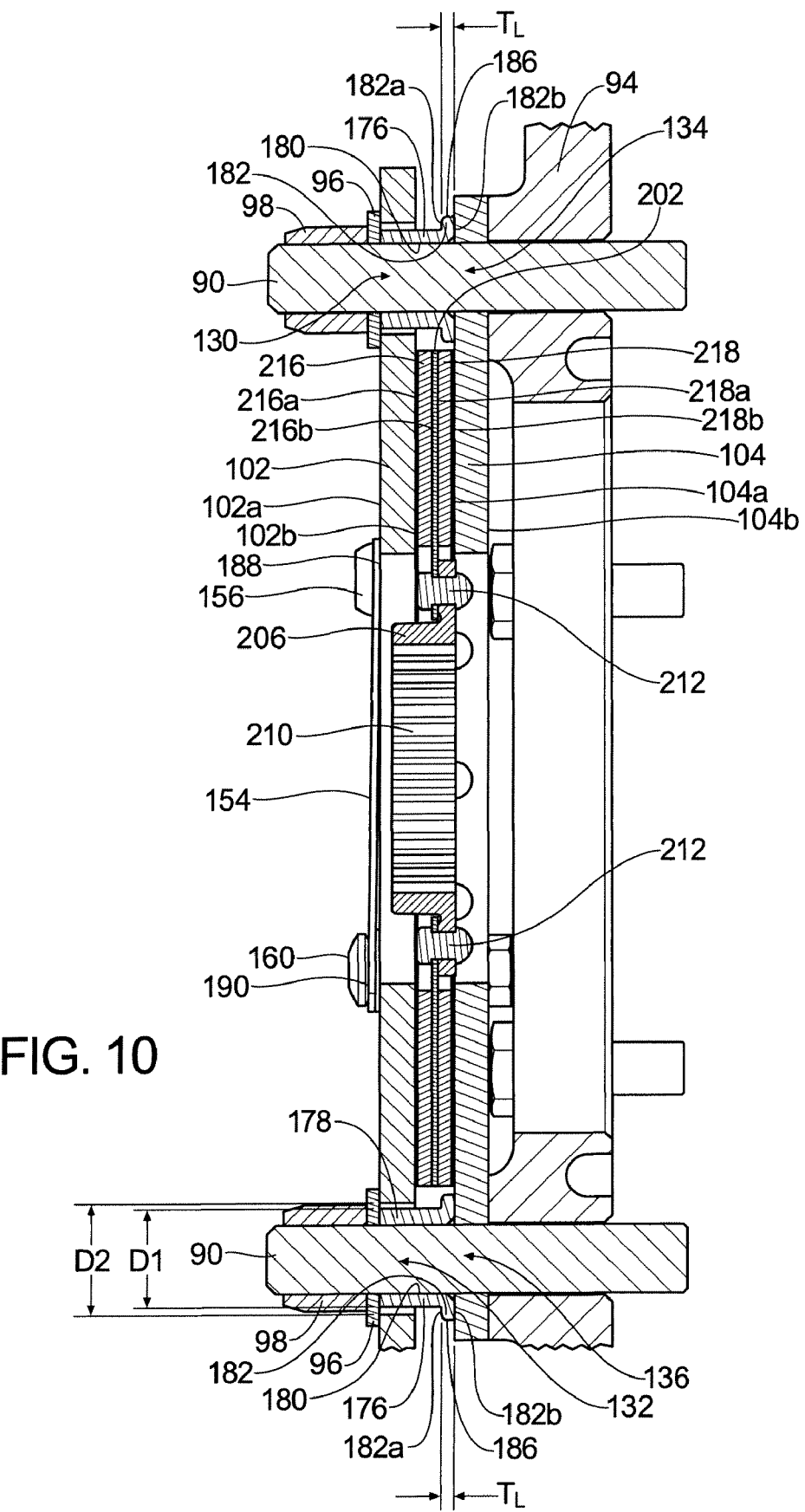
FIG. 10 is a cross-sectional view of a clutch housing and an inertia brake with unworn friction material in an expanded state in accordance with an exemplary embodiment of the invention.
Figure 11:
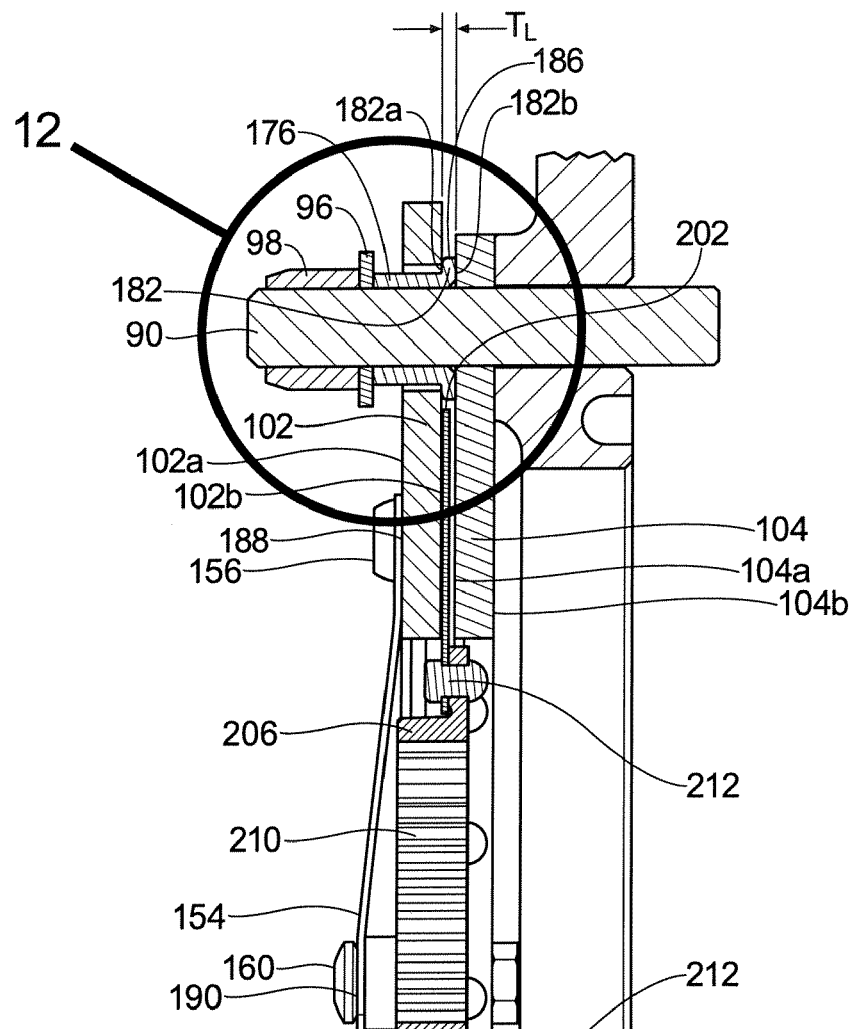
FIG. 11 is a cross-sectional view of a clutch housing and an inertia brake without frictional material in a compressed state in accordance with an exemplary embodiment of the invention.
Figure 11:
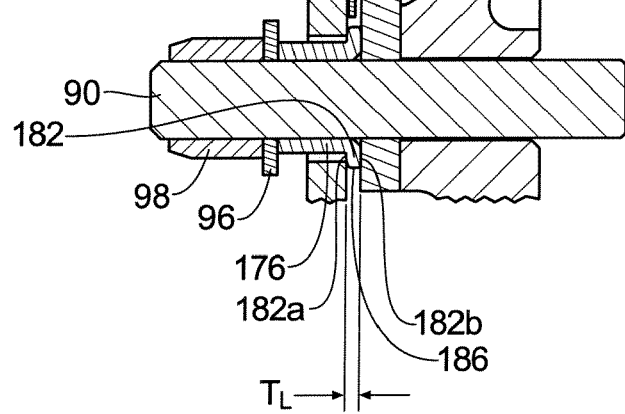
Figure 12:
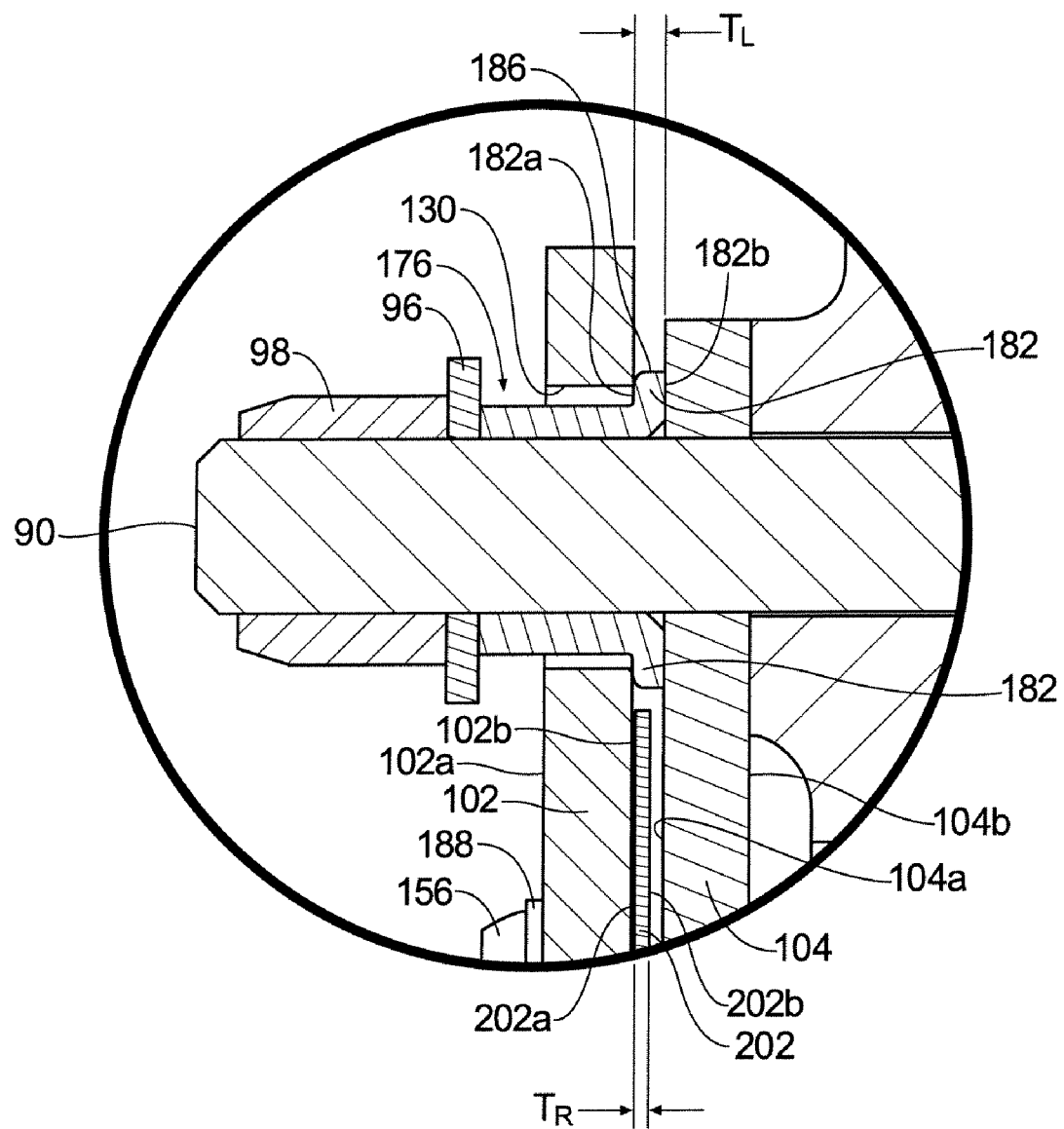
FIG. 12 is an enlarged view of FIG. 11 according to line 12 in accordance with an exemplary embodiment of the invention.

In an embodiment, each sleeve 176 also includes a circumferential lip 182 that radially extends away from an outer surface 184 of the substantially cylindrical body 178. In an embodiment, the circumferential lip 182 defines a front surface 182a, a rear surface 182b and a side surface 186. In an embodiment, as seen in FIGS. 10-12, the side surface 186 is defined by a thickness, $T_L$, having a function that is described in detail in the foregoing disclosure.

In an embodiment, when the sleeve 176 is arranged within the passage 130, 132, each sleeve 176 is retained between the reaction plates 102, 104. In an embodiment, when the sleeve 176 is retained between the reaction plates 102, 104, the front surface 182a of the circumferential lip 182 faces the rear surface 102b of the first/front reaction plate 102 and the rear surface 182b of the circumferential lip 182 faces the front surface 104a of the second/rear reaction plate 104.

Figure 13:
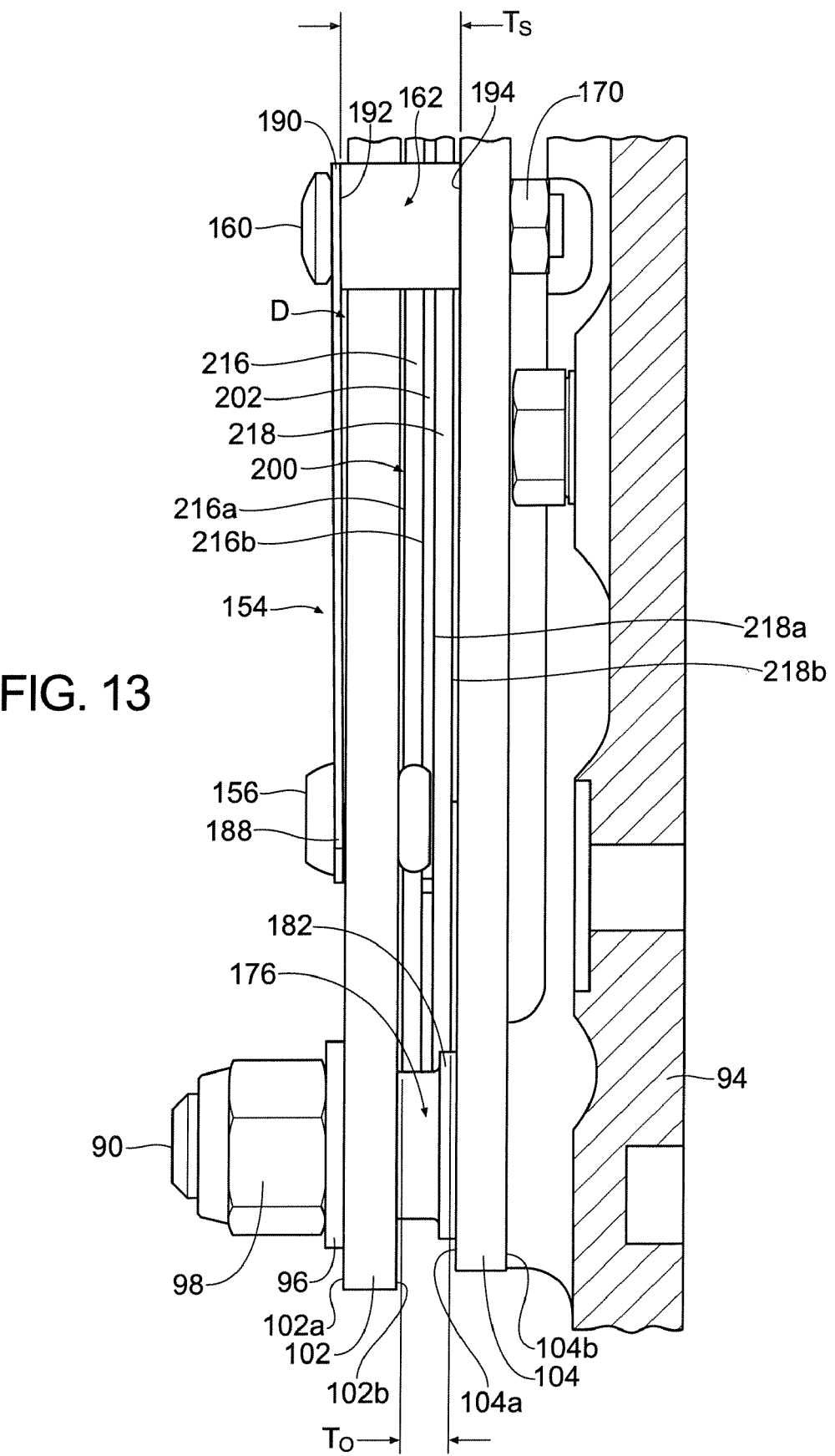
FIG. 13 is an enlarged side view of a clutch housing and an inertia brake in an expanded state in accordance with an exemplary embodiment of the invention.

Referring to FIG. 7B, when the inertia brake assembly 150 is assembled as described above, it will be appreciated that the spacer 162 structurally distinguishes the inertia brake assembly 150 in several aspects. Further, it will be appreciated that the spacer 162 functionally distinguishes the inertia brake assembly 150 as well. Each resilient strap 154 is further defined to include a first end 188 and a second end 190. Then, referring to FIG. 13, the first end 188 of each resilient strap 154 is located adjacent the front surface 102a of the first/front reaction plate 102 and the second end 190 of each resilient strap 154 is located adjacent a first end 192 of the spacer 162 as a second end 194 of the spacer 162 is located adjacent the front surface 104a of the second/rear reaction plate 104 such that a thickness, $T_S$, of the spacer 162 results in the second end 190 of the resilient strap 154 being distanced away from the front surface 102a of the first/front reaction plate 102 at a distance, D.

In an embodiment, the inclusion of the spacer 162 in the design of the inertia brake assembly 150 prevents each of the resilient straps 154 from traversing a portion of an overall thickness, $T_O$, of all of the first/front reaction plate 102, the rotor hub subassembly 200 and the second/rear reaction plate 104. As a result of arranging the resilient straps 154 in the manner described above, the axial bias of the resilient straps 154 imparts an axial force to/"axially preloads" the first/front reaction plate 102 to thereby reduce noise and vibration imparted by the connection of the inertia brake assembly 150 to a stud 90 extending from structure 94.

Further, as a result of arranging the resilient straps 154 in the manner described above, a diameter, $D_R$ (FIG. 8), of the rotor hub subassembly 200 may be maximized to be approximately equal to a diameter, $D_P$ (FIG. 9) of one or more of the reactions plates 102, 104. As such, if, for example, the resilient straps 154 were to otherwise traverse the overall thickness, $T_O$, of the rotor hub subassembly 200, the diameter, $D_R$, of the rotor hub subassembly 200 would have to be reduced to provide a clearance for the resilient straps 154.

It will be appreciated, however, that because the resilient straps 154 do not traverse the overall thickness, $T_O$, defined by the rotor hub subassembly 200, such a positioning of the straps 154 is permitted by the inclusion of the spacers 162 that are arranged around the diameter, $D_R$, of the rotor hub subassembly 200. Accordingly, the arrangement of the spacers 162 around the diameter, $D_R$, of the rotor hub subassembly 200 defines at least a portion of the inertia brake subassembly 100 that provides the function of entrapping and loosely-retaining the rotor hub subassembly 200 discussed above such that the rotor hub subassembly 200 is not separated from the inertia brake subassembly 100 when shipped to an OEM.

It will be appreciated that the entrapping and loosely-retaining of the rotor hub subassembly 200 by the spacers 162 is provided such that no structural element of the inertia brake subassembly 100 axially extends through or axially traverses any portion of the rotor hub subassembly 200. In an embodiment, at least three spacers 162 are arranged around the rotor hub subassembly such that no two neighboring spacers 162 of the three spacers are distanced from one another more than the diameter, $D_R$, of the rotor hub subassembly 200. Further, it will be appreciated that the three spacers 162 are arranged in at least a triangulated manner such that any radial movement of the rotor hub subassembly 200 away from the axis, A-A, during a shipping process to an OEM results in the rotor hub subassembly 200 coming into contact with the cylindrical body 164 of one or more of the spacers 162 such that the rotor hub subassembly 200 is entrapped and loosely-retained between the reaction plates 102, 104.

It will be appreciated that the portion of the of the inertia brake subassembly 100 providing the entrapping and loosely-retaining function may further include the bolts 160 that extend through the passages 166 of each spacer 162. It will be appreciated that the portion of the inertia brake assembly 100 providing the entrapping and loosely-retaining function may further include other components of the connector subassemblies 152, such as, for example, the straps 154 and rivets 156. Further, it will be appreciated that the portion of the inertia brake assembly 100 providing the entrapping and loosely-retaining function may be further defined by the arrangement of the projections 118-128 that are disposed approximately 60°/120° apart upon the circumferential edge 114, 116 of the reaction plates 102, 104.

Figure 14:
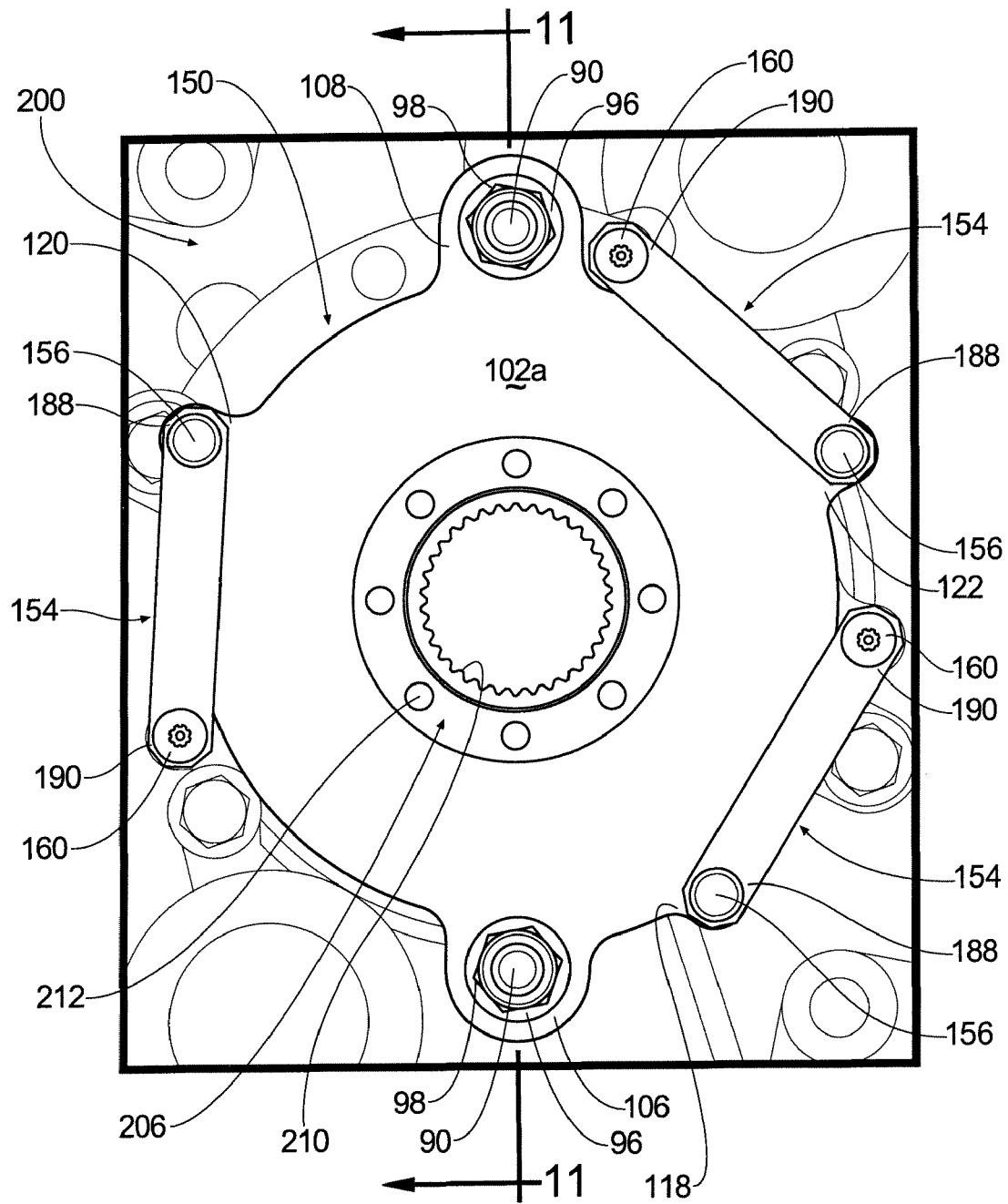
FIG. 14 is a top view of a clutch housing and the inertia brake of FIG. 7B in accordance with an exemplary embodiment of the invention.

Referring to FIG. 14, the inertia brake assembly 150 is shown connected to structure 200. In an embodiment, the structure 200 may include one of the clutch housing 22, transmission 18, or the like discussed above.

Referring to FIG. 14, the structure 94 may include one or more of the axially-extending studs 90. In an embodiment, as seen in FIG. 10, the structure 94 may include two studs 90. In an embodiment, each stud 90 may extend through the passage 134, 136 defined by each bracket 110, 112 of the second/rear reaction plate 104, the passage 180 define by the sleeve 176 and the passage 130, 132 defined by each bracket 106, 108 of the first/front reaction plate 102.

In an embodiment, once the studs 90 are inserted through the passages 130-136 as described above, the studs 90 extend through a washer 96. In an embodiment, the washer 96 may function as an axial stop for the first/front reaction plate 102 when the first/front reaction plate 102 is disengaged. Then, a nut 98 is connected to each stud 90 in order to secure the inertia brake assembly 150 to the structure 94. In an embodiment, when the nut 98 is fully threaded onto the stud 90, the washer 96 is secured adjacent the front surface 102a of the first/front reaction plate 102.

Referring to FIG. 11, the inertia brake assembly 150 is shown with the friction plates 216, 218 of the rotor hub subassembly 200 being worn away after a prolonged period of use such that the only remaining component of the rotor hub subassembly 200 includes the rotor 202 connected to the hub portion 206. As illustrated, the inertia brake assembly 150 is in a compressed state such that the first/front reaction plate 102 is axially moved closer to the second/rear reaction plate 104. When moved to the compressed state, and, when the friction plates 216, 218 are worn away, the rear surface 102b of the first/front reaction plate 102 is disposed adjacent the front surface 182a of the circumferential lip 182 as the front surface 104a of the second/rear reaction plate 104 is disposed adjacent the rear surface 182b of the circumferential lip 182. Thus, when the friction plates 216, 218 are worn away, the reaction plates 102, 104 compress only the circumferential lip 182 of the sleeve 176 to thereby prevent any compression of the rotor 202 of the rotor hub subassembly 200.

Referring to FIG. 12, it can be seen that the thickness, $T_R$, of the rotor 202 is about equal to, but less than the thickness, $T_L$, of the circumferential lip 182 of the sleeve 176. In an embodiment, when the friction plates 216, 218 of the rotor hub subassembly 200 are worn away as described above, the approximately equal, but greater thickness, $T_L$, of the circumferential lip 182 than that of the thickness, $T_R$, of the rotor 202 prevents the reaction plates 102, 104 from compressing the rotor 202. As a result of the inclusion of the sleeve 176 having the circumferential lip 182, damage and/or failure of the rotor hub subassembly 200 is prevented.

The present invention has been shown and described with reference to the foregoing embodiments, which are merely illustrative of the best modes for carrying out the invention. It should be understood by those skilled in the art that various alternatives to the embodiments of the invention described herein may be employed in practicing the invention without departing from the spirit and scope of the invention as defined in the following claims. It is intended that the following claims define the scope of the invention and that the method and apparatus within the scope of these claims and their equivalents be covered thereby. This description of the invention should be understood to include all novel and non-obvious combinations of elements described herein, and claims may be presented in this or a later application to any novel and non-obvious combination of these elements. Moreover, the foregoing embodiments are illustrative, and no single feature or element is essential to all possible combinations that may be claimed in this or a later application.

What is claimed is:

1. An inertia brake assembly, comprising:
   a rotor hub subassembly, wherein the rotor hub assembly includes
      a rotor, and
      at least one frictional plate attached to the rotor; and
   an inertia brake subassembly, wherein the inertia brake subassembly includes
      a first reaction plate connected to a second reaction plate, wherein rotor is disposed between the first reaction plate and the second reaction plate, wherein both of the first and second reaction plates include a radially-projecting bracket defining an axial opening, and
      a sleeve axially inserted through the axial opening of the radially-projecting bracket of one of the first and second reaction plates, wherein the sleeve includes a radially-projecting lip, wherein the radially-projecting lip is disposed between the first reaction plate and the second reaction plate, wherein the rotor is defined by a first thickness, wherein the radially-projecting lip is defined by a second thickness, wherein the at least one frictional plate is defined by a third thickness, wherein the second thickness is about equal to but greater than the first thickness, wherein the second thickness is about equal to but less than the third thickness.

2. The inertia brake assembly according to claim 1, wherein the radially-projecting lip is defined by a front surface and a rear surface, wherein the front surface permits axial engagement of the first reaction plate with the sleeve, wherein the rear surface permits axial engagement of the second reaction plate with the sleeve.

3. The inertia brake assembly according to claim 2, wherein the radially-projecting lip prevents both of the first and second reaction plates from axially-engaging the rotor upon subsequent absence of the at least one frictional plate as a result of one or more of the first and second reaction plates axially engaging and wearing-away at the third thickness of the at least one frictional plate attached to the rotor.

4. The inertia brake assembly according to claim 3, wherein the second thickness of the radially-projecting lip is approximately equal to but greater than the first thickness of the rotor to prevent both of the first and second reaction places from axially-engaging the rotor upon subsequent absence of the third thickness of the at least one frictional plate as a result of one or more of the first and second reaction plates axially engaging and wearing-away the at least one frictional plate.

5. The inertia brake assembly according to claim 1, wherein the rotor includes
   one or more slots that project radially from an outer circumference of the rotor toward a substantially circular central opening of the rotor, wherein each of the one or more slots terminate with and define,
      a substantially circular key-hole slot.

6. The inertia brake assembly according to claim 5, wherein the one or more slots and substantially circular key-hole slots reduce/eliminate hoop stresses of the rotor.

7. An inertia brake subassembly, comprising:
   a first reaction plate and a second reaction plate each including:
      a plurality of radially-extending projections each defining a passage, and
      a plurality of radially-extending bracket each defining a passage;
   one or more connector subassemblies connecting the first reaction plate to the second reaction plate at the plurality of radially-extending projections, wherein the one or more connector subassemblies include at least
   one or more resilient straps, and
   a spacer disposed between the one or more resilient straps and one of the first and second reaction plates; and
   a sleeve axially inserted through each passage defined by the radially-extending bracket of the first reaction plate, wherein the sleeve includes a radially-projecting lip, wherein the radially-projecting lip is disposed between the first reaction plate and the second reaction plate, wherein the radially-projecting lip prevents both of the first and second reaction plates from axially-engaging a rotor disposed between the first and second reaction plates upon subsequent absence of at least one frictional plate attached to the rotor as a result of one or more of the first and second reaction plates axially engaging and wearing-away the at least one frictional plate, wherein the rotor is defined by a first thickness, wherein the radially-projecting lip is defined by a second thickness, wherein the at least one frictional plate is defined by a third thickness, wherein the second thickness is about equal to but greater than the first thickness, wherein the second thickness is about equal to but less than the third thickness, wherein the second thickness of the radially-projecting lip prevents both of the first and second reaction places from axially-engaging the rotor upon subsequent absence of the third thickness of at least one frictional plate as a result of one or more of the first and second reaction plates axially engaging and wearing-away the at least one frictional plate.

8. The inertia brake subassembly according to claim 7, wherein the spacer is arranged to distance:
   (1) the one or more resilient straps away from a front surface of the first reaction plate at a first distance, and
   (2) the one or more resilient straps away from a front surface of the second reaction plate at a second distance.

9. The inertia brake subassembly according to claim 7, wherein spacer axially-loads one of the first and second reaction plates with an axial force.

10. The inertia brake subassembly according to claim 7, wherein the one or more connector subassemblies further comprise:
   a first fastener that connects a first end of the one or more resilient straps to the first reaction plate, and
   a second fastener that connects a second end of the one or more resilient straps to the second reaction plate, wherein the spacer is disposed between the second end of the one or more resilient straps and the second reaction plate.

11. The inertia brake subassembly according to claim 7, wherein the radially-projecting lip is defined by a front surface and a rear surface, wherein the front surface permits axial engagement of the first reaction plate with the sleeve, wherein the rear surface permits axial engagement of the second reaction plate with the sleeve.

* * * * *